United States Patent [19]
Braatz et al.

[11] 4,239,347
[45] Dec. 16, 1980

[54] SEMICONDUCTOR LIGHT VALVE HAVING IMPROVED COUNTERELECTRODE STRUCTURE

[75] Inventors: Paul O. Braatz, Canoga Park; Kuen Chow, Thousand Oaks; Jan Grinberg, Los Angeles, all of Calif.

[73] Assignee: Hughes Aircraft Company, Culver City, Calif.

[21] Appl. No.: 43,077

[22] Filed: May 29, 1979

[51] Int. Cl.³ ............................................. G02F 1/135
[52] U.S. Cl. .................................... 350/336; 350/342
[58] Field of Search ................................ 350/342, 336

[56] References Cited
U.S. PATENT DOCUMENTS

| | | | |
|---|---|---|---|
| 3,824,002 | 7/1974 | Beard | 350/342 |
| 4,093,357 | 6/1978 | Jacobson et al. | 350/342 X |
| 4,191,454 | 3/1980 | Braatz et al. | 350/342 |

Primary Examiner—Edward S. Bauer
Attorney, Agent, or Firm—Elliot N. Kramsky; W. H. MacAllister

[57] ABSTRACT

A liquid crystal light valve having an improved counterelectrode structure. The light valve includes a layer of liquid crystal material which lies intermediate a photosensitive substrate of intrinsic semiconductive material and the counterelectrode. The upper surface of the substrate is characterized by a highly doped peripheral channel stop. The counterelectrode comprises electrically insulated inner and outer regions, the inner region substantially overlying only the intrinsic material interior said highly doped peripheral channel stop so that an electrical bias may be selectively applied, greatly enhancing the dark current breakdown voltage of the device.

9 Claims, 4 Drawing Figures

SEMICONDUCTOR LIGHT VALVE HAVING IMPROVED COUNTERELECTRODE STRUCTURE

TECHNICAL FIELD

The present invention relates to liquid crystal light valves. In particular, this invention pertains to improved counterelectrode means for use in a reflective mode light valve of the type that utilizes a photosensitive layer of semiconductive material.

BACKGROUND ART

Reflective mode light valves may be generally characterized as photovariable voltage dividers. A layer of fixed resistance liquid crystal material and a layer of variable resistance/photosensitive material form the elements of the voltage division network. Relatively low intensity writing (or image) light, when applied to the photosensitive element, produces a spatially resolved decrease in the resistance thereof with a corresponding, spatially resolved increase in the amount of current (measured r.m.s. in the case of an a.c. activated light valve) through the liquid crystal material. The increased current through the fixed resistance of the liquid crystal material produces a spatial voltage profile therein which creates a corresponding spatially resolved rearrangement of the optical properties of the layer of liquid crystal. The physical reorientation of optical properties is, of course, a function, inter alia, of the physical characterization of the liquid crystal material and the mode of activation (a.c. or d.c.) employed. The writing light and the beam of projection light do not interact optically but are coupled solely via the voltage division/liquid crystal reorientation process. As a result of the spatial recharacterization of the optical properties of the liquid crystal material, the relatively high intensity beam of projection light is modulated upon reflection from a reflective surface (often a dielectric mirror) underlying the layer of liquid crystal material. Thus the image is projected from the opposite surface of the light valve at a substantially enhanced intensity.

Reflective mode light valves operating according to the above-referenced principles may be either a.c. or d.c. activated. The basic principles of the a.c. activated light valve are disclosed in U.S. Pat. No. 3,824,002 entitled "Alternating Current Liquid Crystal Light Valve" issued to Beard and assigned to the assignee herein. In general, a.c. activation, where appropriate for the specific liquid crystal material employed, increases the chemical stability of the resultant device although various modes of operation, including the field effect and dynamic scattering modes, may be achieved by a variety of liquid crystal materials (including nematic and cholesteric) activated by either a.c. or d.c.

A significant variation in the characteristics and operation of light valves according to the reflective mode may be traced to the material employed as the photovariable resistance (photosensitive) layer of the device. For the near infrared band, intrinsic silicon, a well-known semiconductor material, provides a very attractive photoactivated variable resistance. A rigorous theoretical exposition of the various processes by which an a.c. activated light valve utilizing a semiconductive substrate of intrinsic material produces a high intensity image is described in the commonly assigned copending U.S. Pat. No. 4,191,454 for "Continuous Silicon MOS A.C. Light Valve Substrate" by P. O. Braatz, et al. As disclosed in that application, the pulsed a.c. bias cycle alternates periods of (potential) liquid crystal excitation (depletion of the substrate of majority carriers) with periods of relaxation (minority/carrier-recombination).

Regardless of the nature of the bias applied, it is essential in both a.c. and d.c. modes to apply the bias voltage across the combination of fixed resistance liquid crystal material and the variable resistance/photosensitive element. One equipotential surface commonly utilized for the application of such bias consists of a transparent, electrically conductive counterelectrode layer affixed to the inner surface of a glass plate adjacent the layer of liquid crystal material.

In a light valve employing a semiconductive substrate, an unavoidable amount of current due to thermally generated minority carriers (denominated "dark current") exists throughout the light valve regardless of the presence or absence of writing light. In a properly functioning light valve, the effects of this current are minimal and the resultant voltage across the liquid crystal material is generally well below the threshold required for significant optical effect. Thus, the minority carriers generated by the photons of the incident writing light, when present, predominate to produce the desired electro-optic effects. However, it has been found that, at biases in the range of 10–30 volts, the phenomenon of dark current breakdown is observed. That is, a significant increase in the sensitivity of minority carrier generation to an incremental increase in voltage is observed in this range, resulting in significant dark current through and a concurrent significant (above the electro-optical threshold) voltage drop across the liquid crystal material. The effect of such a breakdown is the obliteration of the photosensitivity of the device, preventing the projection of image in the affected areas and significantly limiting the operational range of the light valve.

SUMMARY OF THE INVENTION

It is therefore a primary object of the present invention to provide a light valve having an improved breakdown voltage characteristic.

It is a further object of the present invention to provide a light valve which achieves the above by means of an improved counterelectrode structure.

It is another object of the present invention to achieve a light valve of the type wherein a wafer of high resistivity silicon serves as a photosensitive layer which has improved optical chacteristics relative to like devices of the prior art, including but not limited to increased optical sensitivity, resolution and reliability.

It is yet another object of the present invention to achieve an a.c. activated liquid crystal light valve having increased durability.

The aforementioned and additional objectives are achieved by the present invention which provides in a central inventive aspect an improved light valve of the type characterized by a layer of liquid crystal material sandwiched intermediate a transparent counterelectrode and a photosensitive wafer or substrate of semiconductive material. The substantially planar counterelectrode is formed on the inner surface of an overlying glass plate which serves to contain the liquid crystal material. The counterelectrode's geometry provides two electrically insulated portions, the interior portion overlying generally and recessed from the border of a heavily doped channel stop region surrounding a highly purified photoactive region of a semiconductive wafer or substrate underlying a number of functional layers therebetween. The recessed structure of the interior portion of the counterelectrode (to which a biasing electric potential may be applied) allows one to increase the dark current breakdown voltage of the light valve beyond that of the prior art.

An accompanying feature of the present invention is the provision of an elongated lead portion formed with the above-referenced interior portion of the counterelectrode. The lead allows electrical contact to be made between the counterelectrode and external biasing means. The lead portion, which necessarily overlies the intrinsic/channel stop boundary, is dielectrically removed an additional distance from the surface of the semiconductive wafer at the boundary overpass by the provision of a T-groove in the overlying glass plate to greatly diminish the electrical field intensity applied to the underlying boundary and channel stop.

BRIEF DESCRIPTION OF THE DRAWINGS

The novel features of this invention, as well as the invention itself, will be be understood from the accompanying description taken in conjunction with the accompanying drawings, wherein like characters refer to like parts and in which.

DETAILED DESCRIPTION OF THE INVENTION

Figure 1:
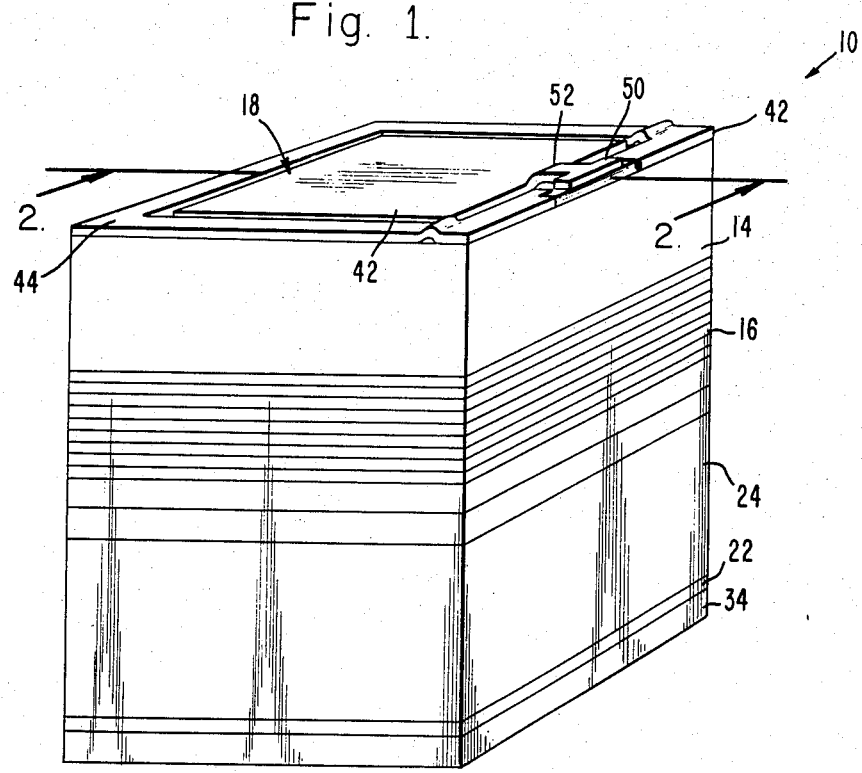
FIG. 1 presents a perspective view of a liquid crystal light valve (absent the overlying glass plate to facilitate the reader's appreciation of the improved counterelectrode structure thereof) according to the present invention.

Referring now to the drawings, in FIG. 1 there is generally shown in perspective the improved light valve 10 of the present invention. The light valve 10 of FIG. 1 is a generally rectangular structure having a cavity to retain a layer of liquid crystal material (not shown in FIG. 1) possessing optoelectric properties. The present invention is in no wise, however, limited to a square or rectangular cross-section and includes within its scope all geometries suitable to any particular end use, including, but not limited to cylindrical devices and the like.

The liquid crystal material is partially retained within a cavity defined by an encircling dielectric spacer wall 14 of oxide or the like and the upper surface of a dielectric mirror 15 by means of a transparent glass plate (not shown). The lower or inner side of the glass plate serves as the base for the improved counterelectrode 18, discussed extensively infra, which provides a central feature of the present invention. The entire structure of FIG. 1 may be mounted in an accommodating casing or container of metal or the like.

Figure 2:
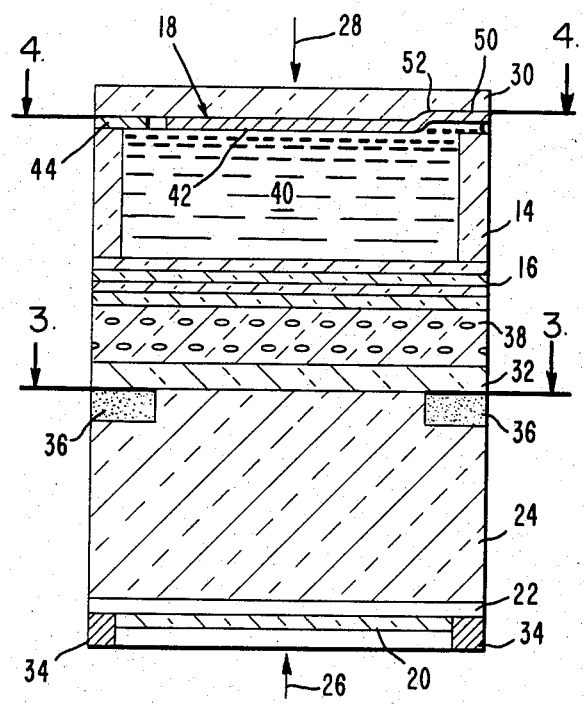
FIG. 2 is a side-sectional view of the light valve of FIG. 1.

A fuller appreciation of the device may now be gained from FIG. 2, a side section (not necessarily to scale) of the light valve 10 taken along the line 2—2 of FIG. 1. The surfaces of the various layers comprising the light valve may be conveniently referenced in terms of its oppositely disposed functional exteriors, the image light side and the projection light side. The image light side exterior surface is coincident with the exterior surface of a thin passivating layer 20 formed of $SiO_2$ or the like which overlies a highly doped (P+) region 22 of the intrinsic silicon ($\pi$) wafer or substrate 24. In operation relatively low intensity image or writing light, represented by the beam 26, is applied to the image light side while high intensity projection light, represented by the beam 28 is applied to the projection light side. The projection light side's exterior surface coincides with the exterior or upper surface of the glass plate 30, the oppositely disposed surface of which provides the base of the counterelectrode 18.

The light valve of FIG. 2 is formed upon the high resistivity silicon substrate 24. The silicon substrate 24 of the device illustrated is P-type with a typical resistivity higher than 1 kilohm-centimeter. (For purposes of nomenclature, a high resistivity P-type semiconductor body is commonly designated with the symbol $\pi$ while a high resistivity material of opposite conductivity type is generally given to the designation $v$. Although $\pi$ material is used for the illustration of the present invention, the invention can be practiced equally well with an N-type material with an accompanying reversal of voltage and current polarities.) A gate insulator 32 comprising, preferably, a layer of $SiO_2$ overlies the projection side of the substrate 24 while the aforementioned P+ doped layer 22 is formed on its writing side. The layer 22 provides a uniform ohmic contact to the back of the substrate 24 so that the electrical potential of the entire writing side of the substrate 24, including points within the substrate, can be raised or lowered in accordance with an external bias voltage applied by means of the adjacent, substrate-encircling metallic contact pad 34. Preferably, the layer 22 is created by a thin degenerative doping to enhance electrical uniformity and still maintain transparency to light so that the photons comprising the writing light 26 pass to the substrate 24 without appreciable absorption. Transparency may be achieved by fabricating the layer 22 optically thin. That is, the thickness of the layer 22 is preferably less than the inverse of the absorption coefficient for photon wavelengths within the desired spectral range. A channel stop 36 encircles the surface of the projection side of the substrate 24, isolating the active $\pi$ region from the deleterious (thermal or photo) effects of minority carrier generation at the outside surfaces of the light valve and additionally serving to isolate the $\pi$ material from the inversion charge typically present at $SiO_2$ interfaces on P-type silicon. The channel stop 36 comprises a P+ "ring," shown clearly in FIG. 3, created by the heavy doping of predetermined regions of the substrate 24 with a P-type impurity using gaseous diffusion or ion implantation. The thickness of the substrate 24, which is prepared on both sides by chemomechanical polishing to assure optically flat and parallel surfaces, is typically 3–10 mils.

Overlying the substrate 24 and gate insulator 32 is a light blocking layer 38. The light blocking layer may consist of any number of materials chosen principally in terms of photon absorption. Functionally, the layer 38 absorbs any portion of projection light 28 that may be transmitted through the adjacent dielectric mirror 16 as a result of the limited finite reflectivity thereof. In CdS light valves, a layer of cadmium telluride is utilized for the light blocking function. Preferably, the layer 38 of FIG. 2 is comprised of cermet since CdTe, for example, is suboptimal for light valves utilizing intrinsic silicon in that CdTe material absorbs light only up to a wavelength of 0.85 μm while the intrinsic silicon substrate 24 remains photosensitive, and hence is useful, for applications involving wavelengths of up to approximately 1.1 μm (near infrared). The cermet layer 38 consist of layers of alternating metallic particles (Sn, In, Pb) and a dielectric layer such as $Al_2O_3$. The metallic particles, when deposited in relatively thin films, coagulate into a dense array of small, electrically noncontinuous metal islands which retain their metallic optical properties at the wavelengths of visible light. The use of alternating layers separated by an insulator reduces electrical conduction in the plane of any given film and thus permits the capacitive coupling of charge between the metal islands of adjacent films. The spacing between the metallic islands is maintained relatively large in comparison to the thicknesses of the insulating films to obtain an impedance level (both d.c. and a.c.) for in-plane charge transfer which is much greater than that between planes. The resultant material is thereby an anisotropically conductive medium with the optical properties of a metal. The use of many alternating films incorporated into a single layer 38 additionally enhances the opacity resultant from multiple light scatterings by the randomly situated metal islands. As the islands are metallic and absorb light by the excitation of free electrons, the cermet layer 38 provides low optical transmissivity over a wider spectral range than that achievable with semi-insulator light blocks (e.g. CdTe) which are limited in effectiveness to the regions of their forbidden band gaps. Cermet light blocking layers which can be adopted for use in either d.c. light valves or a.c. light valves have been described and claimed in U.S. Pat. No. 4,093,357 entitled "Cermet Interface for Electro-Optical Devices" by Jan Grinberg et al and assigned to the present assignee.

The dielectric mirror 16 overlies the cermet light blocking layer 38. For optimal performance, the mirror 16 should, of course, have maximum reflectivity throughout the range of photoexcitation of the underlying intrinsic substrate 24, although a proper selection of the material for the light blocking layer 38, as mentioned supra, will be somewhat ameliorative of undesired transmission. Additionally, maximum reflectivity at the wavelength of the readout projection light 28 is a significant design criterion of the mirror 16. Suitable materials for the fabrication of the dielectric mirror 16 include $TiO_2$, $SiO_2$ and the like. A layer of liquid crystal material 40 is sandwiched between the glass plate 30 (and more specifically the underlying counterelectrode 18) and the dielectric mirror 16. A dielectric spacer 14, as mentioned above, surrounds the liquid crystal material 40, defining the confining cavity therefor. The liquid crystal material 40 may be either d.c. or a.c. activated.

Figure 3:
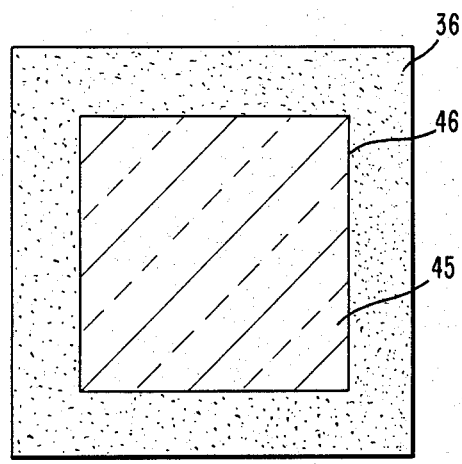
FIG. 3 is a view of the device of the present invention taken at the section 3—3 of FIG. 2 showing the relative locations of the active and channel stop regions of the device.

FIG. 3 shows a cross-sectional view of the light valve 10 taken at the line 3—3 of FIG. 2. This section illustrates the profile of the photosensitive semiconductor adjacent and immediately beneath the gate oxide layer 32. As can be seen, the P+ doped channel stop 36 surrounds the "active" region of intrinsic material 24. One can gain an appreciation of the improved counterelectrode 18 which constitutes a significant feature of the present invention by simultaneous referral to FIG. 3 and FIG. 4, a cross-section taken at line 4—4 of FIG. 2 which presents a plan view of the counterelectrode 18 that overlies the liquid crystal material 40.

Figure 4:
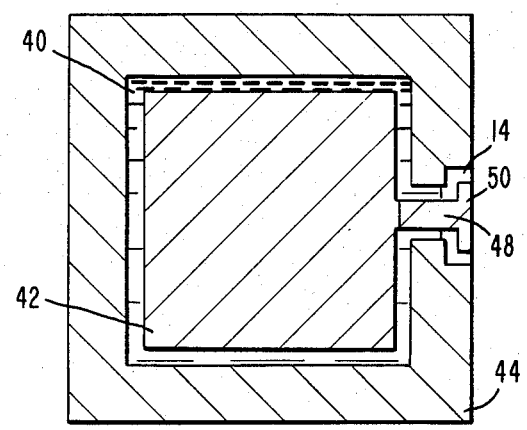
FIG. 4 is a view of the device taken at the section 4—4 of FIG. 2 principally to illustrate, by reference to the preceding figure, the locations of the principal elements of the improved counterelectrode of the present invention with respect to the substrate geometry of FIG. 3.

The counterelectrode 18, a substantially planar member approximately 1,000 to 5,000 Angstroms thick, is formed of transparent, electrically conductive material such as indium tin oxide. It is shown in FIG. 4 to consist of two electrically insulated portions underlying and affixed to the lower or inner surface of the glass plate 30. An interior portion 42 serves as an (externally regulated) equipotential surface for the maintenance of a desired a.c. bias profile (in conjunction with the potential applied to the highly doped region 22) throughout the underlying semiconductive wafer 24 while, in operation, the potential of the surrounding portion 44 is allowed to float. The two portions 42,44 are patterned using standard photolithographic techniques in conjunction with wet chemical etching or photoresist liftoff to remove the unwanted portions of the counterelectrode material from the surface of the glass plate 30. The interior portion 42 is dimensioned to fall within a boundary 46 which defines the intersection of the active region 45 of the underlying wafer 24 and the encircling channel stop 36. The finite spacing between the portions 42,44 provides a dielectric recess between the boundary 46 (seen in FIG. 3) and the outer edge of the interior portion 42 of the counterelectrode 18 (seen in FIG. 4). This recess, which may be on the order of approximately 5-50 mils, allows operation of the light valve absent the application of the externally applied biasing voltage to the boundary 46 or to any portion of the channel stop 34. The biasing of the device 10, in either an a.c. or d.c. mode, is done between two equipotential surfaces, the P+ doped layer 22 and the interior portion 42 of the counterelectrode 18. A thin lead portion 48 having a flared contact 50 is provided and formed with the interior portion 42 to allow means for electrical contact between the interior portion 42 and external biasing means (not shown). The lead 48 is likewise recessed and hence electrically insulated from the surrounding portion 44 of the counterelectrode 18. A T-shaped groove 52 in the overlying glass plate 30 elevates the lead 48 in the vicinity of unavoidable overpass of the boundary 46 and the P+ region 36. The groove 52, in conjunction with the minimal overlying area of the lead 48, and the essentially dielectric quality of the underlying liquid crystal material 40 allows the application of minimal voltage at the P+/π boundary 46 and the P+ region 36. Alternatively, an air gap may underly the lead 48 to enhance or provide the requisite dielectric nature of the space beneath the lead 48. The device as shown in FIG.2 has been overfilled with liquid crystal material 40. The high viscosity and surface tension of the liquid crystal material 40 results in a semipermanent meniscus which retains the liquid throughout the useful life of the light valve 10. Further stability is achieved in operation by the provision of the above-referenced casing of metal or the like.

The above-described counterelectrode 18 differs from present-day liquid crystal light valves which generally feature a unitary counterelectrode structure that overlies the entire cross-section of the photosensitive layer. As a result, in the case of a light valve of the type having a semiconductor substrate doped as shown in FIG. 3, the biasing voltage applied between the counterelectrode and the back contact is applied not only to the active π region 45 of the substrate 24 but also to the heavily doped channel stop 36 which serves to limit the effect of minority carriers generated along the sides of the light valve. (These minority carriers, as opposed to those generated at the writing side of the light valve 10, are not related to the incident writing light 26 and hence represent noise to the system.) The inventors herein have postulated that the enhanced generation of minority carriers observed in the breakdown range of 10-30 volts is related to a lateral electric field at the π/P+ boundary. This electric field is believed by the inventors to result from a large surface potential difference at the $Si/SiO_2$ (substrate 24 and gate oxide layer 32) interface between the active π region 45 and the peripheral channel stop 36. The abrupt boundary (doping profile) between the two regions is believed to allow the lateral voltage difference therebetween to result in electric fields sufficiently large to induce minority carrier generation by the well-known field ionization process. It has been found that a light valve of the type disclosed herein which features the just-referenced improved counterelectrode structure, which is believed to minimize the above-referenced lateral electric fields, may be biased up to 50 volts before any occurrence of the previously-referenced breakdown behavior is observed. This deleterious phenomenon occurs in light valves according to the present invention in the 50-150 volt range, a very substantial increase in light valve operativeness, practicability and reliability.

This invention, having been disclosed in its preferred embodiment, is defined in the appended claims. All other embodiments falling within the language thereof are intended and included within its scope.

We claim:

1. In light valve of the type wherein a layer of liquid crystal material lies intermediate a transparent counterelectrode and a photosensitive semiconductor substrate having an upper surface and a lower surface, said upper surface including a highly doped peripheral channel stop region, the improvement which comprises said transparent counterelectrode overlying essentially only that portion of said upper surface which lies within said peripheral channel stop.

2. A light valve as defined in claim 1 further characterized in that said transparent counterelectrode includes a center portion and a lead portion, said center portion overlying essentially the portion of said upper surface of said substrate interior to said peripheral channel stop and said lead portion comprising a strip in electrical contact therewith, said strip providing connection between said center portion and the edge of said light valve.

3. A light valve as defined in claim 2 further characterized by the dielectric spacing of that portion of said lead which overlies the channel stop and the interface of the interior region of said upper surface with said channel stop.

4. A light valve as defined in claim 3 further characterized in that said interior region consists of intrinsic semiconductor material and said channel stop region consists of highly doped semiconductor material of the same conductivity type.

5. A light valve as defined in claim 4 further characterized in that said counterelectrode is fabricated of indium tin oxide.

6. A light valve as defined in claim 2 further characterized in that said counterelectrode is formed on a surface of a glass plate which overlies said liquid crystal material, said glass plate having a T-shaped groove therein so that the lead portion of said counterelectrode is spaced an additional distance at the point where it overlies the channel stop and the intersection of said interior region of said upper surface and said channel stop.

7. An improved counterelectrode for a light valve of the type wherein liquid crystal material is enclosed between said counterelectrode and a semiconductor substrate of intrinsic material having at least one highly doped region therein, said counterelectrode comprising a transparent layer of electrically conductive material of planar geometry which overlies only the non-doped portions of said substrate whereby there may be applied to said overlying portion greatly increased biasing voltage levels prior to the onset of dark current breakdown.

8. An improved counterelectrode as defined in claim 7 additionally including a thin lead portion, said lead portion providing electrical connection between said counterelectrode and the edge of said light valve.

9. An improved counterelectrode as defined in claim 8 further characterized in that said lead portion is dielectrically spaced from said substrate at those portions that overlie highly doped substrate regions and the interfaces of the highly doped regions of said substrate with the intrinsic region thereof.

* * * * *